(12) United States Patent
Liu et al.

(10) Patent No.: US 8,423,547 B2
(45) Date of Patent: Apr. 16, 2013

(54) EFFICIENT QUERY CLUSTERING USING MULTI-PARTITE GRAPHS

(75) Inventors: Tie-Yan Liu, Beijing (CN); Taifeng Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 47 days.

(21) Appl. No.: 13/083,353

(22) Filed: Apr. 8, 2011

(65) Prior Publication Data

US 2012/0259850 A1   Oct. 11, 2012

(51) Int. Cl.
*G06F 17/30* (2006.01)

(52) U.S. Cl.
USPC .......................................... 707/736; 707/737

(58) Field of Classification Search ................ 707/737, 707/736
See application file for complete search history.

(56) References Cited

U.S. PATENT DOCUMENTS

| | | | |
|---|---|---|---|
| 7,305,389 B2 | 12/2007 | Zeng et al. | |
| 2009/0164895 A1 | 6/2009 | Baeza-Yates et al. | |
| 2009/0192983 A1 | 7/2009 | Elango | |
| 2009/0228353 A1 | 9/2009 | Achan et al. | |
| 2012/0036123 A1* | 2/2012 | Hasan et al. | 707/723 |

OTHER PUBLICATIONS

Beeferman et al., "Agglomerative Clustering of a Search Engine Query Log", Copyright 2000, pp. 407-416.*
Markines et al., "A Scalable, Collaborative Similarity Measure for Social Annotation Systems", Copyright 2009, pp. 347-348.*
Chan, et al., "Clustering Search Engine Query Log Containing Noisy Clickthroughs", Proceedings on the 2004 International Symposium on Applications and the Internet, Aug. 2004, 4 pages.
Hosseini, et al., "Content Free Clustering for Search Engine Query Log", Proceedings of the 7th WSEAS International Conference on Simulaion, Modelling and Optimization, Sep. 2007, pp. 201-206.
Wen, et al., "Query Clustering Using User Logs", ACM Transactions on Information Systems, vol. 20, No. 1, Jan. 2002, pp. 59-81.
Yi, et al., "Query Clustering using Click-Through Graph", Proceedings of the 18th Interanational Conference on World Wide Web, Apr. 2009, pp. 1055-1056.

* cited by examiner

*Primary Examiner* — Hung Q Pham
(74) *Attorney, Agent, or Firm* — Lee & Hayes, PLLC (57) ABSTRACT

Efficient search query clustering using tripartite graphs may enable a search engine developer to model information needs of users while expending less computing resources. The efficient clustering of search queries may involve multiple computing devices receiving a subgraph of a multi-partite graph that encompasses search queries, as well as receiving a global center vector table that includes cluster center entries for query clusters. At each computing device, the received global center vector table may be filtered to eliminate one or more cluster center entries that are irrelevant to the search queries. Subsequently, the search queries may be clustered into the query clusters by at least using the filtered global center vector table at each of the computing devices. In some instances, one or more comparisons between search queries and the cluster center entries in the global center vector table during the clustering may be eliminated.

17 Claims, 6 Drawing Sheets

EFFICIENT QUERY CLUSTERING USING MULTI-PARTITE GRAPHS

BACKGROUND

Web search engines may receive hundreds of millions of search queries from users in a short period of time, such as in the course of a single day. It is common for a developer of a web search engine to analyze these search queries to discern user information needs in order to fine tune the search algorithm used by the search engine. For example, the developer may tune the search algorithm based on the frequency that a particular search query is submitted by different users, or the correlation between different search queries and uniform resource locators (URLs) in the search results ultimately selected by the users. The search engine with the improved search algorithm may deliver more accurate search results.

SUMMARY

Described herein are techniques for efficient search query clustering using multi-partite graphs. Techniques for performing analysis on search queries may involve the clustering of search queries using multi-partite graphs, which may enable common data access patterns or information request trends to be ascertained. However, due to the sheer number of search queries that a typical search engine receives in the short period of time, as well as the diverse subject matter requested by such search queries, query clustering using multi-partite graphs may be difficult without the use of a large amount of computing resources. The techniques described herein may reduce the amount of computing resources employed, both in terms of processing power and processing time, for clustering search queries using multi-partite graphs.

In at least one embodiment, The efficient clustering of search queries may involve multiple computing devices receiving a subgraph of a multi-partite graph that encompasses search queries, as well as receiving a global center vector table that includes cluster center entries for query clusters. At each computing device, the received global center vector table may be filtered to eliminate one or more cluster center entries that are irrelevant to the search queries. Subsequently, the search queries may be clustered into the query clusters by at least using the filtered global center vector table at each of the computing devices. In other embodiments, additional techniques such as increasing the graph density of the multi-partite graph, elimination of irrelative comparisons of the search queries encompassed in each of the subgraphs to the global center vector table, among other techniques, may also be used to make the query clustering even more efficient.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

The embodiments described herein pertain to the efficient clustering of search queries using multi-partite graphs. The number of search queries to be clustered using a multi-partite graph may be in the neighborhood of hundreds of millions of search queries.

Generally speaking, search engine performance may be improved with the modeling of the information demand patterns of the users that submitted the search queries to the search engine. However, individual search queries are quite random as to the subject matter being requested, and do not individually offer clues regarding the overall search demands of the users.

Search query clustering uses data that are recorded in a search engine log with each search query that is received by a search engine to ascertain the overall search demands of the users. The recorded data may include explicit information such as the subject matter of the search queries, as well as implicit information such as machine internet protocol (IP) address, session identifier (ID), user identifiers, impression URLs, clicked URLs, and so forth, associated with the submitted search queries. Impression URLs are URLs that are delivered by a search engine to users in response to each search query. Clicked URLs are the specific URLs in the impression URLs that are selected for further viewing by the users. By clustering search queries based on the recorded data, the resultant search query clusters may represent the information demand patterns of users that submitted the different kinds of search queries.

The clustering of the search queries may be accomplished by formulating a multi-partite graph, such as a user-query-URL tripartite graph discussed in greater detail below, based on the search queries and their associated data recorded in the search engine log, and then conducting graph-based co-clustering to cluster the search queries. The multi-partite graph may enable common data access patterns or information request trends for a web search engine to be ascertained.

The efficient clustering of a large number of search queries using multi-partite graph may enable a search engine developer to model information needs of users that submitted the search queries with less computing resources. Thus, search engine performance and search result accuracy may be enhanced with a smaller outlay of financial and computing resources. As a result, user satisfaction with the perceived accuracy and usefulness of search query results generated by such search engines may be increased at reduced cost. Various examples of techniques for the efficient clustering of search queries using a multi-partite graph are described below with reference to FIGS. 1-6.

Example Scheme

Figure 1:
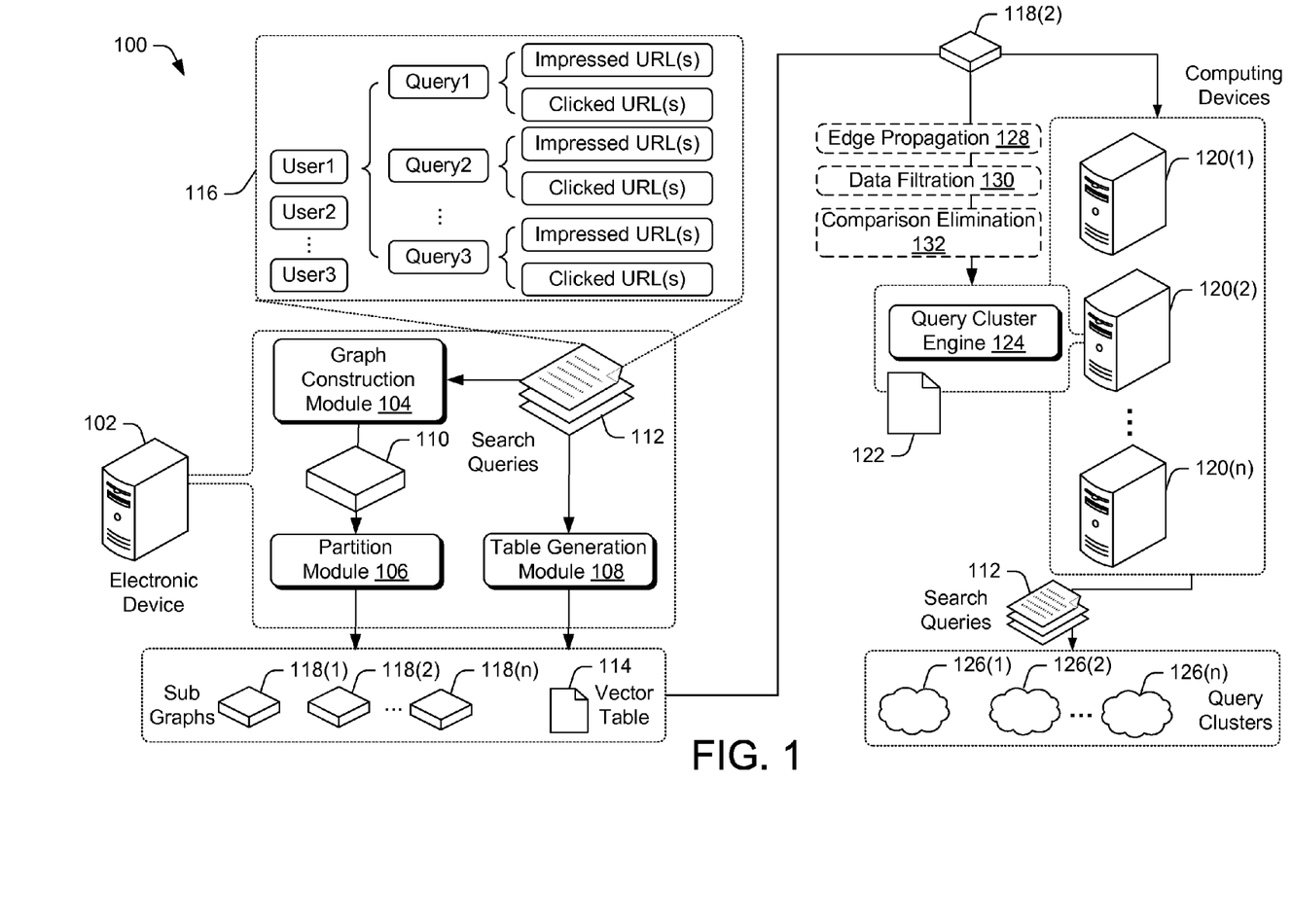
FIG. 1 is a block diagram that illustrates an example scheme that includes computing devices that implement the efficient clustering of search queries using a multi-partite graph.

FIG. 1 is a block diagram 100 that illustrates an example scheme that implements the efficient clustering of search queries using a multi-partite graph. A multi-partite graph may be used to identify user information demand patterns by clustering search queries that are recorded in a search engine log into different search query clusters. For example, a particular search query cluster may represent a demand for price information for a game console. In this way, billions of search queries that are processed by a search engine may be summarized, for example, into millions of search query clusters, with each cluster representing a particular user information demand pattern.

In various embodiments, an electronic device 102 may store a graph construction module 104, a partition module 106, and a table generation module 108. The graph construction module 104 and the partition module 106 may construct and partition a multi-partite graph 110 that is used to cluster search queries 112. The table generation module 108 may generate and distribute an initial global center vector table 114 that synchronizes search query clustering based on the multi-partite graph 110 across multiple computing devices.

The electronic device 102 may be a general purpose computer, such as a desktop computer, a tablet computer, a laptop computer, a server, a cloud server, or so forth. However, in other embodiments, the electronic device 102 may be a smart phone, a game console, a personal digital assistant (PDA), or so forth.

The graph construction module 104 and the partition module 106 may be stored in a memory of the electronic device 102 and implemented by one or more processors on the electronic device 102. The memory may include computer readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, random access memory (RAM), read-only memory (ROM), electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

The graph construction module 104 that is implemented on the electronic device 102 may construct the multi-partite graph 110. The multi-partite graph 110 may be constructed using data associated with search queries 112 that is recorded in a search engine log 116. As shown in FIG. 1, the information in the search engine log 116 may be organized in an organization tree according to users, in which the search queries performed by each user are associated with that user. Each search query may be additionally associated with one or more impression URLs and one or more clicked URLs. As described above, the impression URLs are URLs that are delivered by a search engine to users in response to search queries. On the other hand, the clicked URLs are the specific URLs in the impression URLs that are selected for further viewing by a user.

The multi-partite graph 110 may encompass data related to the search queries 112 in different sets of nodes, that is, different sets of interconnected partites. In various embodiments, the multi-partite graph 110 may include a tri-partite graph that includes a "user-query partite" that stores information on the users that submitted the search queries 112, a "query-user, URL" partite that stores information on the search queries, and a "URL-query" partite that stores information on the URLs associated with the search queries. For example, a URL may be associated with a search query when the URL is an impression URL or a clicked URL. In such embodiments, the search queries 112 that are represented in the multi-partite graph 110 may be clustered based on a k-means clustering algorithm.

However, since the multi-partite graph 110 usually contains a large amount of data, clustering may use a lot of computing resource. The partition module 106 may partition the multi-partite graph 110 into subgraphs 118(1)-118($n$) for processing by multiple computing devices 120(1)-120($n$), efficiently distributing the clustering process.

The table generation module 108 may generate and distribute an initial global center vector table 114 to each of the multiple computing devices 120(1)-120($n$) along with the distribution of the subgraphs 118(1)-118($n$). The global center vector table 114 may be seeded with one or more preliminary cluster centers to facilitate the clustering of the search queries 112. The global center vector table 114 may be used by the computing devices 120(1)120($n$) to track the search query clusters discovered in the subgraphs 118(1)-118($n$) and to synchronize the query clustering performed by the computing devices 120(1)-120($n$). As a result, the clustering of the search queries 112 may be performed in a distributed manner. For example, the computing device 120(2) may receive the subgraph 118(2) and a vector table copy 122 of the global center vector table 114. The computing device 120(2) may include a query cluster engine 124. The query cluster engine 124 may process the subgraph 118(2) and the vector table copy 122 of the global center vector table 114 to cluster a subset of search queries of the search queries 112 that are encompassed in the subgraph 118(2).

In various embodiments, the query cluster engine 124 on the computing device 120(2) may use several techniques to improve the effectiveness and efficiency in which the search queries 112 are clustered into the query clusters 126(1)-126($n$). In some embodiments, the query cluster engine 124 may modify the subgraph 118(2) by performing edge propagation 128 to supplement the number of edges in the subgraph 118(2) during implementation of the clustering algorithm. The increase in the number of edges in the subgraph 118(2) may increase the edge density of the subgraph 118(2). The increase in graph edge density may counter the sparseness of the subgraph 118(2) that is due to the larger number of users that submitted the search queries, as well as the diversity in the subject matter raised in the search queries. Otherwise, when a subgraph 118(2) that is too sparse is processed by the query cluster engine 124, the subgraph 118(2) may result not in clusters but in isolated graph nodes that are of little value.

In other embodiments, the query cluster engine 124 may further perform lossless data filtration 130 on the vector table copy 122 of the global center vector table 114. The vector table copy 122 may include data that is not relevant to the subset of search queries that is distributed to the query cluster engine 124. Thus, upon receiving the vector table copy 122, the query cluster engine 124 may prune the irrelevant data from the vector table copy 122. The pruning of irrelevant data from the vector table copy 122 of the global center vector table 114 may increase efficiency of clustering by reducing the amount of storage memory utilized as well as reduce the computations performed during clustering.

In further embodiments, during the actual clustering of the search queries that are encompassed in the subgraph 118(2) into the query clusters 126(1)-126(n), the query cluster engine 124 may cut down computing time by eliminating certain search query comparisons. The default operations for clustering the search queries involve the comparison of each search query with multiple cluster centers indicated by the vector table copy 122 of the global center vector table 114. However, the query cluster engine 124 may eliminate comparisons between each of the search queries and one or more cluster centers that are determined to be irrelevant to each search query. The use of such comparison elimination 132 may further reduce computing resource usage.

By using these techniques, the query cluster engine 124 may increase the effectiveness and efficiency of clustering search queries distributed to the computing device 120(2). Further, since a corresponding query cluster engine that incorporates these techniques may be installed on each of the remaining computing devices 120(1)-120(n), the overall efficiency for the clustering of the search queries 112 using the multi-partite graph 110 may be dramatically increased. For example, the number of comparison performed to cluster the search queries 112 into the query clusters 126(1)-126(n) may be reduced from millions to hundreds.

Moreover, additional techniques may further increase the efficiency and effectiveness of the search query clustering. In various embodiments, the search queries 112 may be gathered over a longer time window to increase the density of the original multi-partite graph 110. Further, as described below with respect to FIG. 4, a fast copy technique may be used to increase the speed at which updated copies of the global center vector table 114 are distributed among the computing devices 120(1)-120(n) during iterations of the k-means clustering algorithm. The implementation of these techniques for increasing the efficient of search query clustering is further described below in FIGS. 2-6.

Example Computing Device Components

Figure 2:
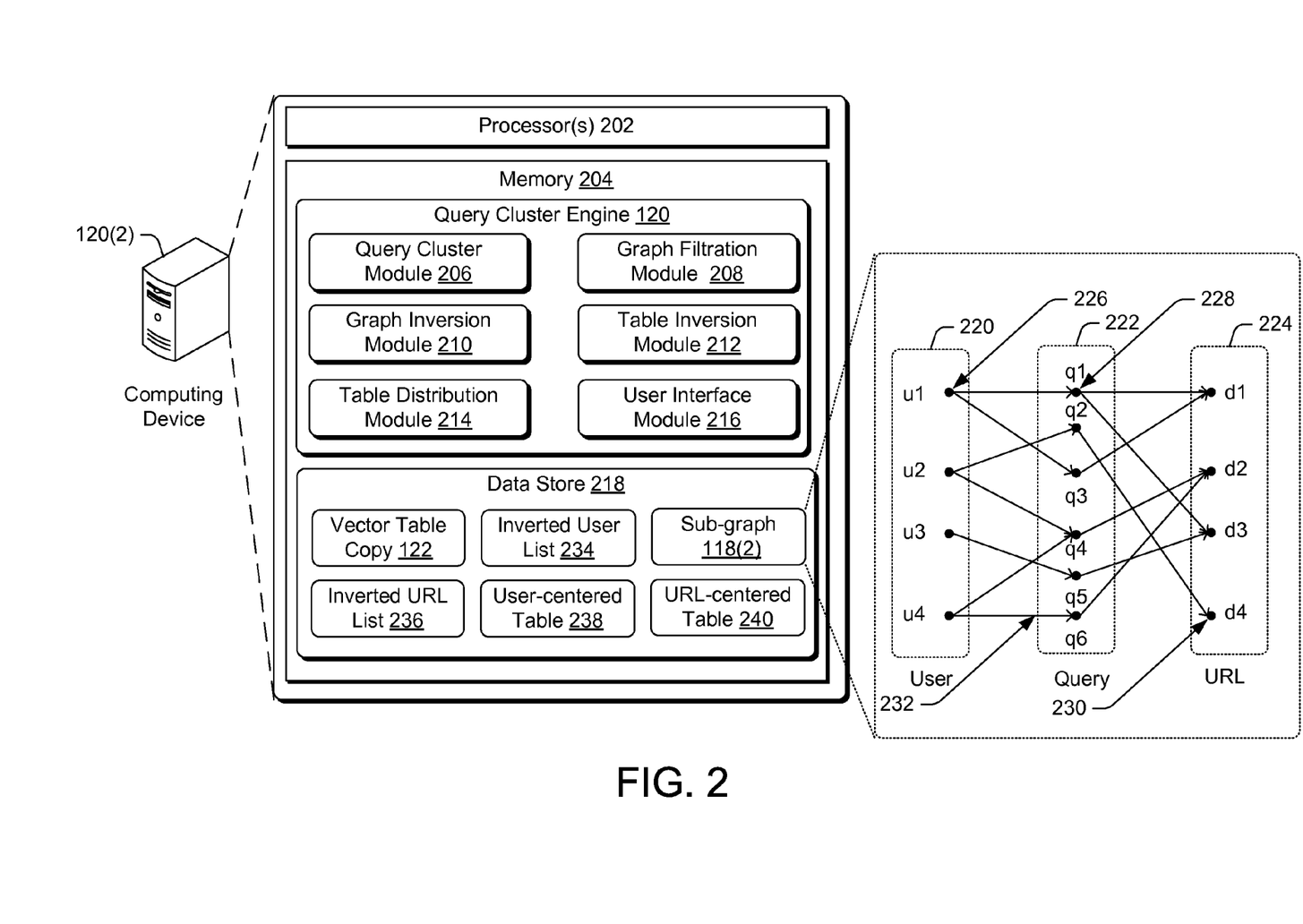
FIG. 2 is a block diagram that illustrates selected example components in each of the computing devices that implement the efficient clustering of search queries using a subgraph of the multi-partite graph.

FIG. 2 is a block diagram that illustrates selected components in each of the computing devices that implement the efficient clustering of search queries using a subgraph of the multi-partite graph. In various embodiments, each of the computing devices 120(1)-120(n) may be a general purpose computer, such as a desktop computer, a tablet computer, a laptop computer, a server, and so forth. However, in other embodiments, the computing device 120(1)-120(n) may be computing devices in a computing cloud. In such embodiments, the computing devices 120(1)-120(n) may be located in a single data center of the computing cloud, or distributed across a plurality of data centers of the computing cloud.

The computing devices 120(1)-120(n) may be connected to the electronic device 102 by a network. The network may be a local area network ("LAN"), a larger network such as a wide area network ("WAN"), and/or a collection of networks, such as the Internet. Protocols for network communication, such as TCP/IP, may be used to implement the network.

The components in each of the computing devices 120(1)-120(n), such as the computing device 120(2), may includes one or more processors 202, memory 204, and/or user controls that enable a user to interact with the electronic device. The memory 204 may be implemented using computer readable media, as described above in connection with device 102, such as computer storage media.

The one or more processors 202 and memory 204 of the computing device 120(2) may implement modules of the query cluster engine 124. The modules may include, among other modules, a query cluster module 206, a graph filtration module 208, a graph inversion module 210, a table inversion module 212, a table distribution module 214, a user interface module 216, and data store 218. The modules may include routines, programs instructions, objects, and/or data structures that perform particular tasks or implement particular abstract data types.

The query cluster module 206 may perform its distributed tasks associated with clustering the search queries 112 using a k-means clustering algorithm. In various embodiments, the query cluster module 206 may perform its tasks using the subgraph 118(2) and the vector table copy 122 of the global center vector table 114 that are distributed to the computing device 120(2). As shown in FIG. 2, the subgraph 118(2), being similar to the multi-partite graph 110 from which it is partitioned, may include a user portion 220, a query portion 222, and a URL portion 224. Further, the user portion 220 may include nodes, such as a node 226, which represent at least some of the users who submitted the search queries 112. Likewise, the query portion 222 may include nodes, such as a node 228, which represent at least some of the search queries 112. Further, the URL portion 224 may include nodes, such as the node 230, which represent at least some the URLs that are visited by the users include the user portion 220. Any relationship between the users, queries, and URLs may be represented by edges, such as the edge 232, which connects two respective nodes.

For each of the subgraph portions 220, 222, and 224, the other related portions of the subgraph 118(2) may form the feature vectors used by the k-means clustering algorithm. Accordingly, in some embodiments, each query in the query portion 222 may be represented as: queryID{<url id, url weight> . . . }, {<user id, user weight> . . . }. Likewise, each user in the user portion 220 may be represented as: userID, {<query id, query weight> . . . }, and each URL in the URL portion 224 may be represented as: urlID, {<query id, query weight> . . . }. The query cluster module 206 may cluster the subset of search queries encompassed in the subgraph 118(2) based on such representations using the k-means clustering algorithm, or an equivalent alternative algorithm.

In some embodiments, the query cluster module 206 may increase the graph density, that is, the number of edges in the subgraph 118(2), for use in the search query clustering. As described above, the increase in graph density may reduce or eliminate the possibility that the application of the k-means clustering algorithm to the subgraph 118(2) may only produce isolated nodes of little value. The propagation of additional edges in the subgraph 118(2) during application of the k-means clustering algorithm by the query cluster module 206 is further illustrated in FIG. 3.

Figure 3:
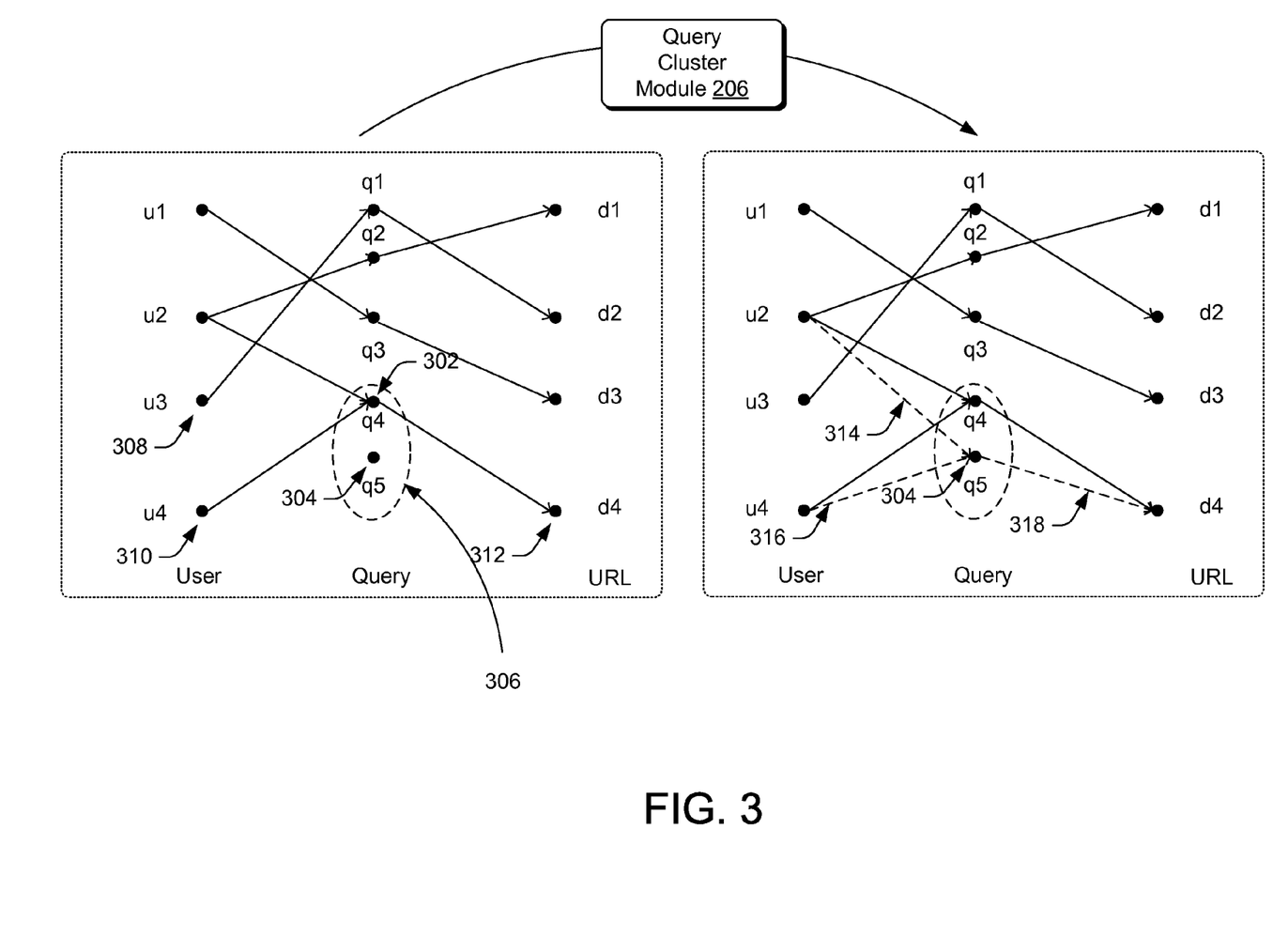
FIG. 3 is a schematic diagram that illustrates an example propagation of additional edges in a multi-partite graph.

FIG. 3 is a schematic diagram that illustrates an example propagation of additional edges in an example multi-partite graph 300. As shown, by applying the k-means clustering algorithm, the query cluster module 206 may of the algorithm cluster "query 4" node 302 and "query 5" node 304 into a query cluster 306. Accordingly, since the "query 4" node 302 and the "query 5" node 304 are now in the same query cluster, the query cluster module 206 may merge "query 5" node 304 into the feature vectors of the "user 4" node 308 and "user 5" node 310, which were previously only related to "query 4" node 302. Moreover, the query cluster module 206 may also merge "query 5" node 304 into the feature vector of "URL 4" node 312, which was only previously related to the "query 4" node 302. With these merges, the query cluster module 206 may generate additional edges 314 and 316 that relate the "user 4" node 308 and the "user 5" node 310 respectively to the "query 5" node 304, as well as generate an additional edge 318 that relates the "query 5" node 304 to the "URL 4" node 312. Further, at the end of the iteration, the global center vector table 114 that is distributed to each of the computing devices 120(1)-120(n) may be updated to record such cluster and edge additions, as described in greater detail below.

Returning to FIG. 2, once the feature vectors are updated, the query cluster module 206 may start another iteration of clustering based on the updated feature vectors using the k-means clustering algorithm, which may lead to the discovery of additional clustering of queries in the subgraph 118(2) and updates to the global center vector table 114 to reflect such additions. In this way, the query cluster module 206 may apply the k-means clustering algorithm iteratively until the search query clusters reach stable states.

The graph filtration module 208 may perform the lossless data filtration 130 on the received vector table copy 122 of the global center vector table 114. As described above, the global center vector table 114 synchronizes the search query clustering performed by the computing devices 120(1)-120(n), and updated copies of the global center vector table 114 may be distributed to each of the computing devices 120(1)-120(n) as they become available. The feature vectors listed in the global center vector table 114 contains data on all the users and URLs related to each cluster center of the search query clusters. Once the computing device 120(2) receives the vector table copy 122, the query cluster module 206 may use the vector table 122 to cluster the search queries encompassed in the subgraph 118(2). However, the vector table copy 122 often contains information regarding cluster centers of search query clusters that are not related to the search queries encompassed in the subgraph 118(2). For instance, an illustrative example of the vector table copy 122 may show the following cluster centers with the accompanying features in corresponding feature vectors:

| Center | Features |
| --- | --- |
| Cluster 1 center | User1, user2, user3, user5, url1, url3, url8 |
| Cluster 2 center | User1, user3, user8, user10, url2, url3, url5 |
| Cluster 3 center | User2, user7, user10, user12, url3, url4, url6 |
| ... | ... |

However, if none of the search queries encompassed in the subgraph 118(2) have the features "user1" and "url1", then the "cluster 1 center", which specifically includes both "user1" and "url1" as features, may be filtered out of the vector table copy 122 of the global center vector table 114. In other words, the clustering of each search query encompassed in the subgraph 118(2) into a suitable query cluster may be conceptualized as comparing each search query with each of the cluster centers (e.g., "cluster 1 center," "cluster 2 center," "cluster 3 center") in the vector table copy 122 to find a suitable match. However, since in this example none of the search queries encompassed in the subgraph 118(2) has both the features "user1" and "url1" as specified for the "cluster 1 center", it would not be possible for "cluster 1 center" to be a match to any of the search queries encompassed in the subgraph 118(2). Therefore, the graph filtration module 208 may eliminate the entry corresponding to the "cluster 1 center" from the example vector table copy 122 shown above. By repeatedly applying such an operation, the graph filtration module 208 may eliminate irrelevant cluster center data entries from the vector table copy 122 to reduce the amount of storage memory utilized as well as reduce the computations performed by the computing device 120(2).

In some embodiments, the graph filtration module 208 may implement the elimination of irrelevant cluster center data entries from the vector table copy 122 by using an inverted user list 234 and an inverted URL list 236. The graph filtration module 208 may use the graph inversion module 210 to generate the inverted user list 234 and the inverted URL list 236 from the subgraph 118(2). The inverted user list 234 may include a list of users that are enumerated in the subgraph 118(2). For example, with respect to the illustrative example of the vector table copy 122 described above, the inverted user list 234 may include user1, user2, user3, and so forth. Likewise, the inverted URL list 236 may include a list of URLs that are enumerated in the subgraph 118(2). For example, with respect to the illustrative example of the vector table copy 122 described above, the inverted URL list 236 may include url1, url2, url3, and so forth.

Thus, in the example described above, by referencing both the inverted user list 234 and the inverted URL list 236, the graph filtration module 208 may determine that "user1" does not appear in the inverted user list 234, and "url1" does not appear in the inverted URL list 236. As such, the graph filtration module 208 may filter out the cluster center entry for "cluster 1 center" from the vector table copy 122. By repeatedly applying such an operation for the all the cluster center entries in the vector table copy 122, the graph filtration module 208 may achieve lossless filtration of the vector table copy 122.

The query cluster module 206 may use the filtered vector table copy 122 to perform search query clustering. Once again, the clustering of each search query encompassed in the subgraph 118(2) into a suitable query cluster may be conceptualized as comparing each search query with each of the cluster centers (e.g., "cluster 1 center," "cluster 2 center," "cluster 3 center") in the vector table copy 122 to find a suitable match. However, in some cases, some of these comparisons may be eliminated without affecting the final clustering results.

As described above, each of the search queries encompassed in the subgraph 118(2) may include a "user" feature and a "URL" feature. Thus, in the context of the illustrative example of the vector table copy 122 as describe above:

| Center | Features |
| --- | --- |
| Cluster 1 center | User1, user2, user3, user5, url1, url3, url8 |
| Cluster 2 center | User1, user3, user8, user10, url2, url3, url5 |
| Cluster 3 center | User2, user7, user10, user12, url3, url4, url6 |
| ... | ... | there is no need for the query cluster module 206 to compare a particular search query encompassed in the subgraph 118(2) to the "cluster 1 center" entry in the vector table copy 122 if the particular search query exhibits certain characteristics. These characteristics are: (1) the "user" feature vector of a particular search query encompassed in the subgraph 118(2) does not correspond to any of the users listed in the "cluster 1 center", i.e., no correspondence to any of "User1, user2, user3, users", and (2) the "URL" feature vector of the particular search query does not correspond to any of the URL listed in the "cluster 1 center", i.e., no correspondence to any of "url1, url3, url8". In other words, since a particular query may only get some meaningful similarity with cluster centers having feature vectors which have at least one user or at least one URL in common with the feature vectors in the particular search query, the query cluster module 206 may forego the comparison between the particular search query and a deficient cluster center.

In various embodiments, the elimination of comparisons between search queries encompassed in the subgraph 118(2) and irrelevant cluster centers in the vector table copy 122 may be facilitated by the use of a user-centered table 238 and a URL-centered table 240.

The query cluster module 206 may use the table inversion module 212 to derive the user-centered table 238 and the URL-centered table 240. In turn, the table inversion module 212 may generate the user-centered table 238 and the URL-centered table 240 by inverting the data that is in the vector table copy 122 of the of the global center vector table 114.

With the inversion, the user-centered table 238 may, for each of the users enumerated in the vector table copy 122, list the related cluster centers. For instance, a user-centered table 238 for the illustrative example of the vector table copy 122 shown above may include the following entries:

| Users | Related Centers |
|---|---|
| User1 | Cluster 1 center, Cluster 2 center |
| User2 | Cluster 1 center, Cluster 3 center |
| User3 | Cluster 1 center, Cluster 2 center |
| User4 | None |
| User5 | Cluster 1 center |
| User6 | None |
| User7 | Cluster 3 center |
| User8 | Cluster 2 center |
| User9 | None |
| User10 | Cluster 2 center, Cluster 3 center |
| User11 | None |
| User12 | Cluster 3 center |
| ... | ... |

Likewise, the URL-centered table 240 may, for each of the URLs enumerated in the vector table copy 122, list the related cluster centers. For instance, a URL-centered table 240 for the illustrative example of the vector table copy 122 shown above may include the following entries:

| URLs | Related Centers |
|---|---|
| URL1 | Cluster 1 center |
| URL2 | Cluster 2 center |
| URL3 | Cluster 1 center, Cluster 2 center, Cluster 3 center; |
| URL4 | Cluster 3 center |
| URL5 | Cluster 2 center |
| URL6 | Cluster 3 center |
| URL7 | None |
| URL8 | Cluster 1 center |
| ... | ... |

Thus, if the user feature vector and the URL feature vector of a particular search query is "user7" and "URL5", respectively, the query cluster module 206 may reference both the user-centered table 238 and the URL-centered table 240 and determine that no comparison between the particular query and the table entry for "cluster 1 center" is necessary. Conversely, since "cluster 2 center" is at least associated with "URL5" and "cluster 3 center" is at least associated with "user 7", query cluster module 206 may compare the particular search query with the table entries for "cluster 2 center" and "cluster 3 center." In this way, the query cluster module 206 may leverage the user-centered table 238 and the URL-centered table 240 to reduce the number of comparisons performed during search query clustering. For example, in some instances, the number of comparisons being performed on the computing device 120(2) for the subgraph 118(2) may be reduced from millions to hundreds. As such, the efficiency of the computation performed by the computing device 120(2) may be greatly enhanced.

The table distribution module 214 of computing device 120(2) may coordinate with similar table distribution modules on other computing devices 120(1)-120(n) to perform fast copy distribution of the global center vector table 114 to each of the computing devices 120(1)-120(n). The fast copy distribution performed by the table distribution module 214 is illustrated in FIG. 4.

Figure 4:
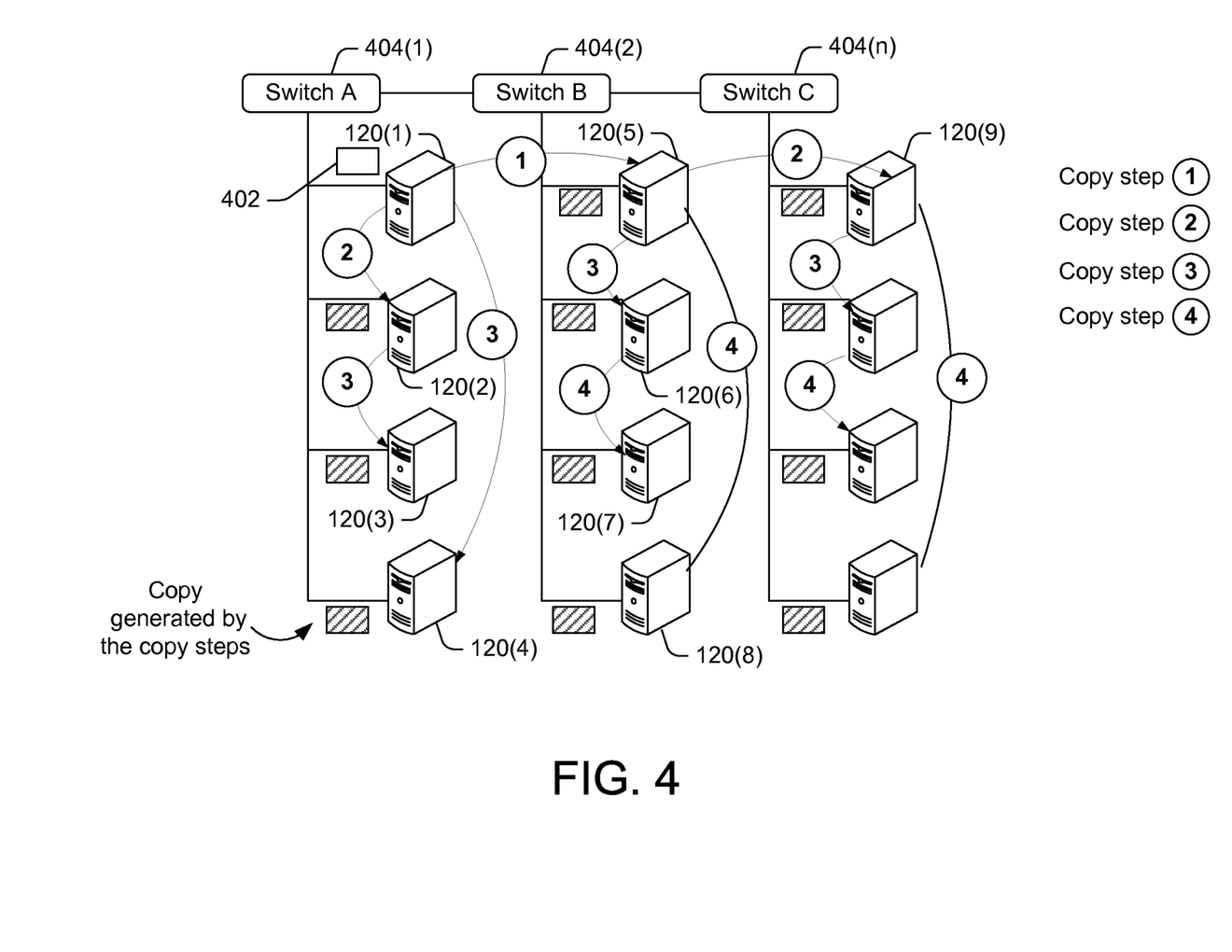
FIG. 4 is a schematic diagram that illustrates an example scheme for distributing a global center vector table to a plurality of computing devices.

FIG. 4 is a schematic diagram that illustrates an example distribution of a global center vector table 114 to a plurality of computing devices. As shown, a plurality of switches 404(1)-404(n) are connected together to distribute data across a computing network. Each of the switches 404(1)-404(n) may connect a corresponding group of computing devices from the computing devices 120(1)-120(n). For example, switch A may connect computing devices 120(1)-120(4), switch B may connect computing devices 120(5)-120(8), and so forth. Each of the computing devices 120(1)-120(n) may include a table distribution module, such as the table distribution module 214.

The table distribution modules on the computing devices 120(1)-120(n) may adopt an "across a switch, then within a switch" fast copy distribution strategy for distributing the global center vector table 114 to all the computing devices 120(1)-120(n). For example, when a computing device 120(1) on the switch 404(1) has a source global center vector table 114 to be distributed, the computing device 120(1) may initially generate and distribute a copy 402 of the source global center vector table 114 to a computing device 120(5) that is on the switch 404(2) during a first copy step. The source global center vector table 114 may be a global center vector table that is received from the electronic device 102. Alternatively, the source global center vector table 114 may be an updated copy that has been modified by the query cluster module on the computing device 120(1) during an iteration of the k-means clustering algorithm. In the latter case, the modifications may include the addition of one or more cluster center entries and/or addition of one or more feature vectors to at least one existing cluster center entry.

In a subsequent step, the computing device 120(1) may generate and distribute a copy of the source global center vector table 114 to the computing device 120(2) that is within the same switch 404(1). In the same step, the computing device 120(5) that received a copy of the global center vector table 114 may generate and distribute another copy to the computing device 120(9) that is on the switch 404(n). In further steps, illustrated by copy steps 3 and 4 in FIG. 4, each of the computing devices that previously received a copy of the global center vector table 114 may either further generate and distribute a copy of the global center vector table 114 to another computing device that is connected to the same switch, or distribute the copy to a computing device that is connected to another switch if no computing device that is connected to the switch has previously received a copy of the global center vector table 114.

In this way, the fast copy distribution strategy as coordinated by the table distribution modules on the computing devices 120(1)-120(n) may rapidly distribute copies of the global center vector table 114 to all of the computing devices 120(1)-120(n). In contrast, a conventional distribution strategy may have the computing device 120(1) distribute the source global center vector table 114 sequentially to the rest of the computing devices 120(1)-120(n), which is a much slower operation.

Returning to FIG. 2, the user interface module 216 may enable a user to interact with the various modules on the computing device 120(2) using a user interface (not shown). The user interface may include a data output device (e.g., but not limited to, a visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods. In various embodiments, the user interface module 216 may enable a user to monitor the progress of the search query clustering, monitor the amount of processing power being used to analyze the subgraph 118(2), as well as obtain data with respect to efficiency gains achieved with the implementation of edge propagation 128, data filtration 130, and comparison elimination 132, among other techniques and results.

The data store 218 may store the vector table copy 122, the subgraph 118(2) that is distributed to the computing device 120(2), the inverted user list 234, the inverted URL list 236, the user-centered table 238, and the URL-centered table 240. The data store 218 may further store intermediate products generated during the search query clustering performed by the computing device 120(2).

While the modules 206-216 and data store 218 of the computing device 120(2) are described above, it will be appreciated that each of the remaining computing devices 120(1)-120(n) may be equipped with similar modules and data stores. In this way, each of the computing devices 120(1)-120(n) may perform search query clustering on the search queries 112 in a distributed manner. Further, in some alternative embodiments, the graph construction module 104, the partition module 106, and the table generation module 108 that are implemented on the electronic device 102 may also be implemented on one of the computing devices 120(1)-120(n), such as on the computing device 120(2).

Example Processes

Figure 5:
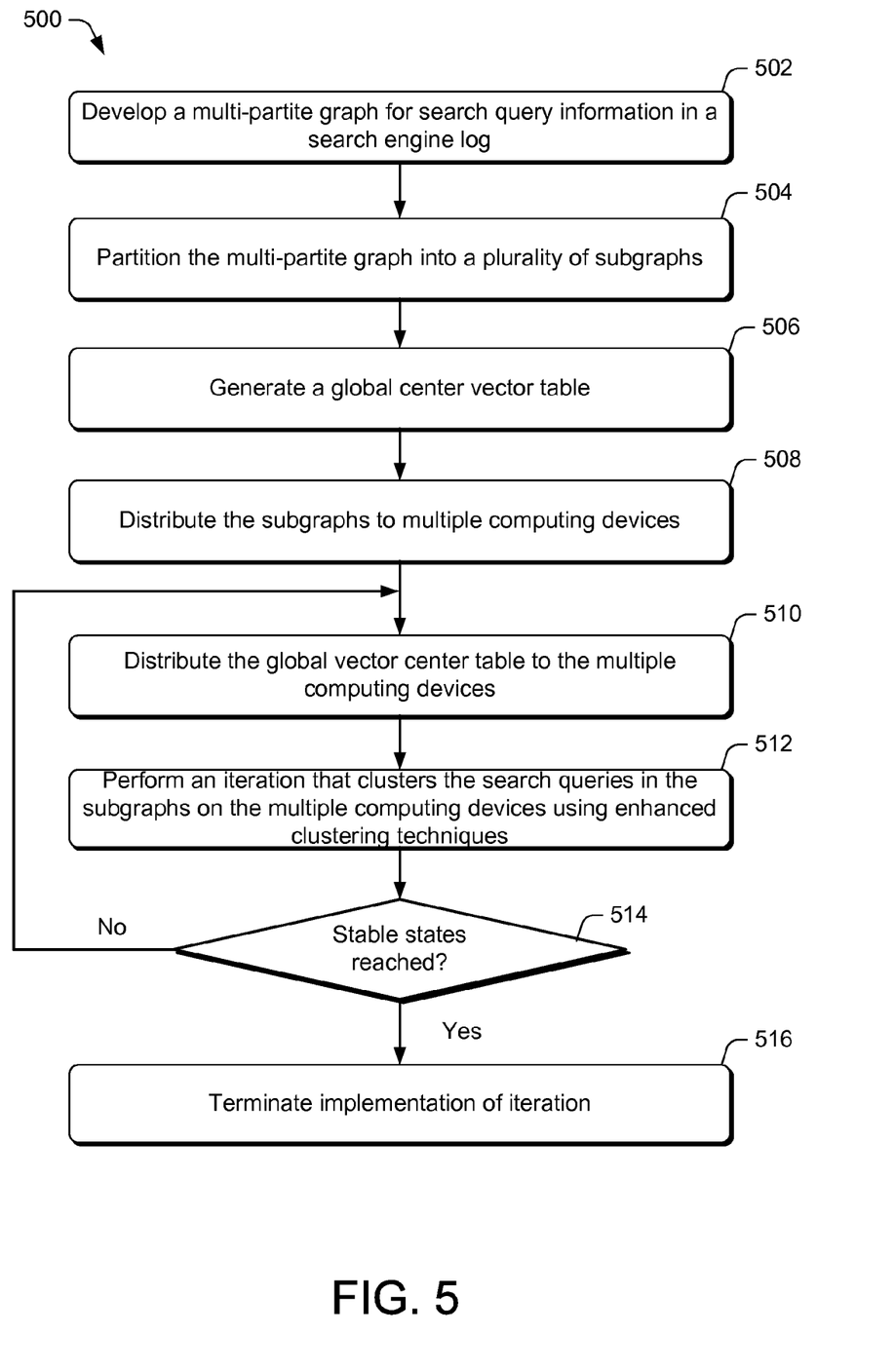
FIG. 5 is a flow diagram that illustrates an example process to efficiently cluster search queries using a multi-partite graph.
Figure 6:
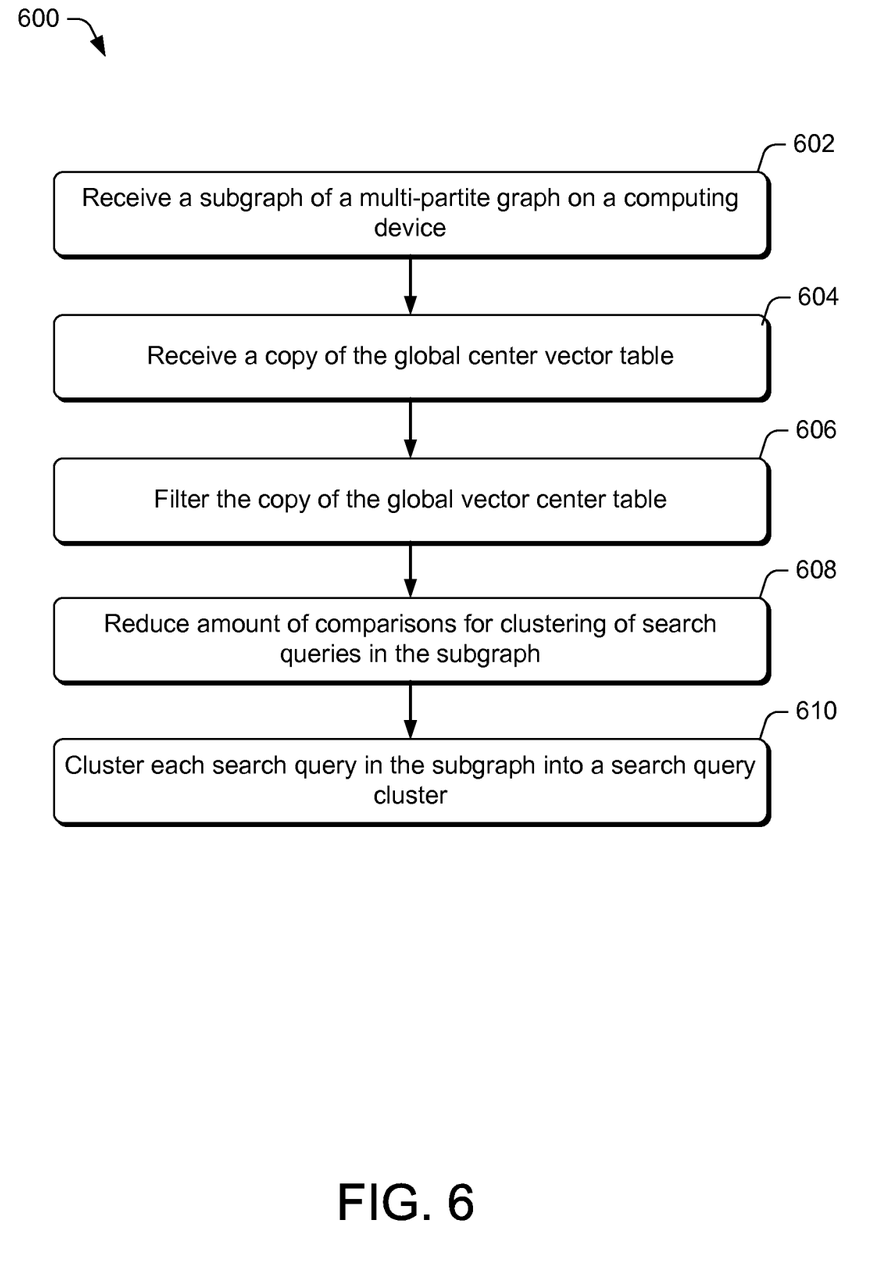
FIG. 6 is a flow diagram that illustrates an example process to efficiently cluster search queries encompassed in a subgraph of the multi-partite graph.

FIGS. 5-6 describe various example processes for efficiently clustering search queries using a multi-partite graph, which may be adapted in accordance with the alternatives described in greater detail in the preceding sections. The order in which the operations are described in each example process is not intended to be construed as a limitation, and any number of the described blocks can be combined in any order and/or in parallel to implement each process. Moreover, the blocks in each of the FIGS. 5-6 may be operations that can be implemented in hardware, software, and a combination thereof. In the context of software, the blocks represent computer-executable instructions that, when executed by one or more processors, cause one or more processors to perform the recited operations. Generally, computer-executable instructions include routines, programs, objects, components, data structures, and so forth that cause the particular functions to be performed or particular abstract data types to be implemented.

FIG. 5 is a flow diagram that illustrates an example process 500 to efficiently cluster search queries using a multi-partite graph. At block 502, the graph construction module 104 on the electronic device 102 may develop a multi-partite graph 110. The multi-partite graph 110 may be a tripartite graph that is constructed using data that is recorded in a search engine log 116. In various embodiments, the tripartite-graph may include a "user-query partite" that stores information on the users that submitted the search queries 112, a "query-user, url" partite that stores information on the search queries, and a "URL-query" partite that stores information on the URLs associated with the search queries. For example, a URL may be associated with a search query when the URL is an impression URL or a clicked URL. The search queries 112 that are represented in the multi-partite graph 110 may be clustered based on a k-means clustering algorithm. In some embodiments, the graph density of the multi-partite graph 110 may be increased by gathering search queries 112 over a longer time window and/or including both impression URLs and clicked URLs into the multi-partite graph 110.

At block 504, the partition module 106 on the electronic device 102 may partition the multi-partite graph 110 into multiple subgraphs 118(1)-118(n). The partition of the multi-partite graph 110 may enable the use of distributed computing to cluster the search queries 112 encompassed in the multi-partite graph 110.

At block 506, the table generation module 108 on the electronic device 102 may generate an initial global center vector table 114. The initial global center vector table 114 may be seeded with one or more preliminary cluster centers to facilitate the clustering of the search queries 112.

At block 508, the partition module 106 may distribute the subgraphs 118(1)-118(n) to the multiple computing devices 120(1)-120(n) for processing via a k-means clustering algorithm. At block 510, the table generation module 108 may distribute the initial global center vector table 114 to the multiple computing devices 120(1)-120(n) via the fast copy distribution strategy described above.

At block 512, an iteration of a clustering algorithm that clusters the search queries 112 as encompassed in the subgraphs 118(1)-118(n) into the query clusters 126(1)-126(n) may be performed. The iteration of the search query clustering may be performed by query cluster engines that are present on the computing devices 120(1)-120(n). The query cluster engines may implement a k-means clustering algorithm in a distributed manner to cluster the search queries. In various embodiments, the query cluster engine on each of the computing devices, such as the query cluster engine 124, may be provided with several techniques that enhance the execution effectiveness and efficiency of the k-means clustering algorithm. These techniques may include edge propagation 128, data filtration 130, and comparison elimination 132 that increases the efficiency of search query clustering performed on the computing devices 120(1)-120(n). The iteration of the clustering algorithm may produce one or more updated subgraphs 118(1)-118(n) and an updated copy of the global center vector table 114.

At decision block 514, the clustering algorithm may determine whether each of the one or more query clusters, such as the query clusters 126(1)-126(n), has reached a stable state after the iteration. If the clustering algorithm determines that the query clusters have not reached stable states ("no" at decision block 514), the process 500 may loop back to block 508.

At block 508, the query cluster engines (e.g., query cluster engine 120) on the computing devices 120(1)-120(n) may distribute the updated copy of the global center vector table 114 among themselves. Subsequently, another iteration of the clustering algorithm may be performed by the query cluster engines on the computing devices 120(1)-120(n) at block 512. However, if at decision block 514 the clustering algorithm determines that the query clusters have reached stable states ("yes" at decision block 514), the process 500 may proceed to block 516. At block 516, iterative implementation of the clustering algorithm may be terminated at block 516. In this way, iterations of the k-means clustering algorithm that discovers new cluster centers and updates the global center vector table 114 may be executed until the query clusters reach stable states.

FIG. 6 is a flow diagram that illustrates an example process 600 to efficiently cluster search queries encompassed in a subgraph of a multi-partite graph on a computing device. The example process 600 may further illustrate block 512 of the example process 500 by detailing the enhanced search query clustering techniques that are implemented on each of the computing devices 120(1)-120(n).

At block 602, a computing device, such as the computing device 120(2), may receive a subgraph, such as the subgraph 118(2), from the electronic device 102. The subgraph may be a partitioned portion from the multi-partite graph 110.

At block 604, a vector table copy 122 of the global center vector table 114 may be received on the computing device 120(2). The vector table copy 122 may be an initial global center vector table that is generated by the table generation module 108, or an updated copy that is produced by another device of the computing devices 120(1)-120(n). The vector table copy 122 may be distributed to the computing device 120(2) via the fast copy distribution strategy described above.

At block 606, the query cluster engine 124 on the computing device 120(2) may use the graph filtration module 208 to filter the vector table copy 122 of the global center vector table 114. In various embodiments, one or more cluster center entries in the vector table copy 122 that only include feature vectors, i.e., users and URLs, that are absent from the search queries encompassed in the subgraph 118(2) may be filtered out of the vector table copy 122, as such entries are irrelevant. In some embodiments, the filtering of irrelevant cluster center entries from the vector table copy 122 may be performed using the inverted user list 234 and the inverted URL list 236. The query cluster engine 124 may use the table inversion module 212 to generate the inverted user list 234 and the inverted URL list 236.

At block 608, the query cluster engine 124 may reduce the amount of comparisons to be performed for the clustering of search queries encompassed in the subgraph 118(2). In various embodiments, the query cluster engine 124 may eliminate a comparison between a particular cluster center entry in the vector table copy 122 and a search query encompassed in the subgraph 118(2) when the particular cluster center entry lacks at least one user feature vector and at least one URL feature vector in common with the search query. In other words, when none of the users listed in the particular cluster center entry are in common with one or more users associated with the search query, and none of the URLs listed in the particular cluster center entry are in common with the one or more URLs that are associated with the search query, then no comparison between the search query and the particular cluster center entry is needed. Thus, by performing such comparison elimination for each search query encompassed in the subgraph 118(2) with respect to all the cluster center entries, the number of comparisons for search query clustering may be reduced.

In some embodiments, the query cluster engine 124 may perform the comparison elimination with the use of the user-centered table 238 and the URL-centered table 240. The query cluster engine 124 may use the graph inversion module 210 to generate the user-centered table 238 and the URL-centered table 240.

At block 610, the query cluster module 206 of the query cluster engine 124 may cluster each search query encompassed in the subgraph 118(2) by implementing iterations of the k-means clustering algorithm. During each of the iterations, the query cluster module 206 may perform edge propagation 128 to increase the graph density of the subgraph 118(2). Further, as described above, the global center vector table 114 is to be synchronized between all the computing devices 120(1)-120(n). As such, any modifications to the vector table copy 122 by the query cluster module 206 during each of the iterations may cause the table distribution module 214 to distribute the updated vector table copy 122 to the remaining of the computing devices 120(1)-120(n) via the fast copy distribution described above. The modifications may include the addition of one or more cluster center entries and/or addition of one or more feature vectors to at least one existing cluster center entries in the vector table copy 122.

While the example process 600 is described in the context of the computing device 120(2), it will be appreciated that the example process 600 may be executed by any of the computing device 120(1)-120(n).

The techniques described herein for efficiently clustering queries using multi-partite graphs may enable a search engine developer to model information needs of users that submitted the search queries while expending less computing resources. Thus, search engine performance and search result accuracy may be enhanced with reduced outlay of financial and computing resources. As a result, user satisfaction with the perceived accuracy and usefulness of search query results generated by such search engines may be increased at reduced cost.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

The invention claimed is:

1. A computer-readable medium storing computer-executable instructions that, when executed, cause one or more processors to perform acts comprising:
receiving a subgraph of a multi-partite graph, wherein the received subgraph encompasses search queries;
receiving a global center vector table that includes cluster center entries for query clusters;
filtering the received global center vector table to eliminate one or more cluster center entries that are irrelevant to the search queries in the received subgraph; and
clustering the search queries in the received subgraph into the query clusters by at least comparing each of the search queries to at least some of the cluster center entries in the received global center vector table, wherein the clustering includes eliminating a comparison between a cluster center entry in the received global center vector table and a search query of the search queries by using a user-centered table that lists related cluster centers for each user enumerated in the received global center vector table and a URL-centered table that lists related cluster centers for each URL enumerated in the received global center vector table.

2. The computer-readable medium of claim 1, further comprising instructions that, when executed, cause the one or more processors to perform an act of updating the global center vector table with a new cluster center entry or at least one feature vector for an existing cluster center entry to generate an updated global center vector table.

3. The computer-readable medium of claim 2, further comprising instructions that, when executed, cause the one or more processors to perform an act of distributing the updated global center vector table to a plurality of computing devices.

4. The computer-readable medium of claim 1, wherein each cluster center entry include a cluster center, at least one user feature vector, and at least one uniform resource locator (URL) feature vector.

5. The computer-readable medium of claim 1, wherein the multi-partite graph is a tripartite graph that includes a first partite that stores information on users that submitted the search queries, a second partite that stores information on the search queries, and third partite that stores information on uniform resource locators (URLs) associated with the search queries.

6. The computer-readable medium of claim 1, wherein the filtering includes filtering out a cluster center entry in the global center vector table that includes feature vectors having no more than at least one user and at least one URL that are absent from the search queries.

7. The computer-readable medium of claim 6, wherein the filtering out the cluster entry includes filtering out a cluster entry using an inverted user list that lists the users enumerated in the subgraph and an inverted URL list that lists the URLs enumerated in the subgraph.

8. The computer-readable medium of claim 1, wherein the eliminating includes eliminating the comparison when the cluster center entry lacks at least one user feature vector and at least one URL user feature vector in common with the search query.

9. The computer-readable medium of claim 1, wherein the clustering includes clustering the search queries using a plurality of iterations of a k-means clustering algorithm.

10. The computer-readable medium of claim 9, wherein the clustering includes increasing a graph density of the subgraph by propagating an edge from a user node or a URL node in the subgraph to a newly clustered query in a query cluster during a clustering iteration.

11. A computer-implemented method, comprising:
receiving, at each of a plurality computing devices, a subgraph of a multi-partite graph, wherein the received subgraph encompasses a group of search queries, and each received subgraph including a different group of search queries from a plurality of search queries;
receiving, at each of the plurality computing devices, a copy of a global center vector table that includes cluster center entries for query clusters;
filtering the received copy of a global center vector table on each of the plurality of computing device to eliminate one or more cluster center entries that are irrelevant to a corresponding group of search queries in a corresponding received subgraph; and
clustering the plurality of search queries into the query clusters by at least comparing each group of search queries from each corresponding received subgraph to a corresponding filtered copy of the global center vector table, wherein the clustering includes eliminating a comparison between a cluster center entry in the corresponding filtered copy of the global center vector table and a search query of the plurality of search queries by using a user-centered table that lists related cluster centers for each user enumerated in the corresponding filtered copy of the global center vector table and a URL-centered table that lists related cluster centers for each URL enumerated in the corresponding filtered copy of the global center vector table.

12. The computer-implemented method of claim 11, further comprising generating the multi-partite graph that encompasses the plurality of search queries and the global center vector table that includes the cluster center entries for the query clusters.

13. The computer-implemented method of claim 11, wherein the multi-partite graph is a tripartite graph that includes a first partite that stores information on users that submitted the search queries, a second partite that stores information on the search queries, and a third partite that stores information on URLs associated with the search queries.

14. The computer-implemented method of claim 11, wherein the clustering includes eliminating a comparison between a cluster center entry in a particular copy of global center vector table and a search query in a group of search queries that corresponds to the particular copy when the cluster center entry lacks at least one user feature vector and at least one URL user feature vector in common with the search query.

15. The computer-implemented method of claim 11, wherein the clustering includes increasing a graph density of a subgraph by propagating an edge from a user node or a URL node in the subgraph to a newly clustered query in a query cluster.

16. A computing device, comprising:
one or more processors; and
a memory that includes a plurality of computer-executable components, the plurality of computer-executable components executed by one or more processors to perform steps comprising:
receiving a subgraph of a multi-partite graph, wherein the received subgraph encompasses search queries;
receiving a global center vector table that includes cluster center entries for query clusters;
filtering the received global center vector table to eliminate one or more cluster center entries that are irrelevant to the search queries in the received subgraph; and
clustering the search queries in the received subgraph into the query clusters by at least comparing each of the search queries to at least some of the cluster center entries in the received global center vector table, wherein the clustering includes eliminating a comparison between a cluster center entry in the received global center vector table and a search query of the search queries by using a user-centered table that lists related cluster centers for each user enumerated in the received global center vector table and a URL-centered table that lists related cluster centers for each URL enumerated in the received global center vector table.

17. The computing device of claim 16, wherein the filtering includes filtering out a cluster center entry in the global center vector table that includes feature vectors having no more than at least one user and at least one URL that are absent from the search queries, and eliminating a comparison between a cluster center entry in the global center vector table and a search query when the cluster center entry lacks at least one user feature vector and at least one URL user feature vector in common with the search query.

* * * * *